L. D. Gale
Apparatus for Making Gas.
No. 3872.
Reissued Mar. 8. 1870
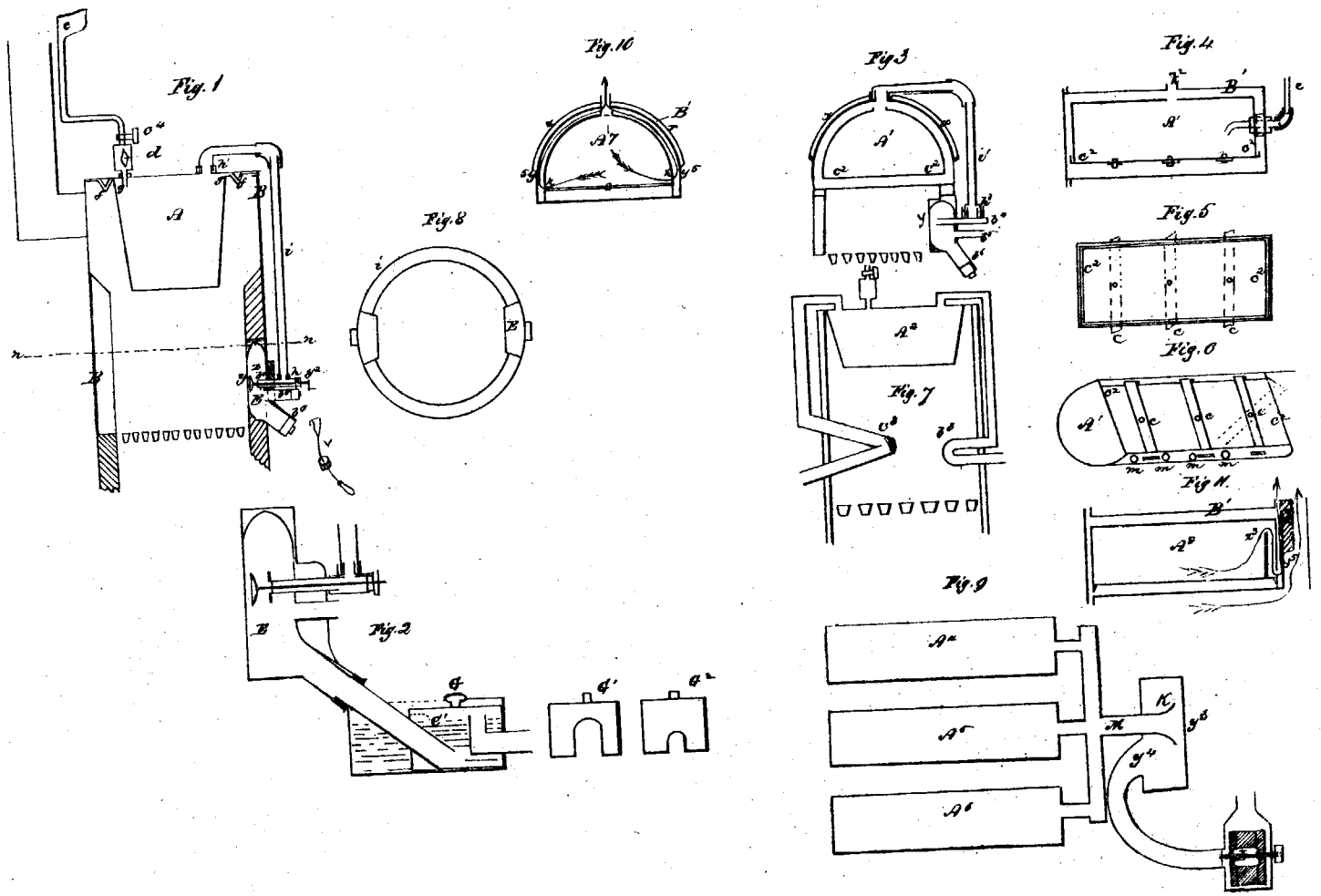

UNITED STATES PATENT OFFICE.

WILLIAM J. NICHOLS AND ALONZO C. RAND, OF NEW YORK, N. Y., ASSIGNEES, BY MESNE ASSIGNMENTS, OF L. D. GALE, ASSIGNORS TO WILLIAM J. NICHOLS, ALDEN B. RAND, AND RICHARD H. BROWN, OF SAME PLACE.

IMPROVEMENT IN APPARATUS FOR THE MANUFACTURE OF GAS.

Specification forming part of Letters Patent No. 26,028, dated November 8, 1859; reissue No. 3,872, dated March 8, 1870.

*To all whom it may concern:*

Be it known that LEONARD D. GALE, of the city and county of Washington, in the District of Columbia, invented a new and Improved Apparatus for Treating Solid and Liquid Hydrocarbons for Preparing Coke and Illuminating-Gas; and the following is a full and exact description thereof, reference being had to the accompanying drawings and references marked thereon, which constitute a part of this invention.

The nature of the invention consists in vaporizing all the volatile portions of solid or liquid hydrocarbons by first converting them into vapor at a heat below a cherry red, and then forcing the vapor so generated into contact or against a red-hot surface, whether that surface be the heated side of an outer retort, or the passage through a red-hot tube, or any other heated surface.

In the processes now in use for making coal-gas, as well as those for making it from other substances, the crude material is all heated to the cherry-red heat at once, while in my process the whole mass is only heated to a temperature approximating to a red heat while not exceeding one-fifth of the mass, or that which is vaporized is heated to a full red heat. Newcastle coal yields an average of not far from twenty per cent. of hydrocarbons; of this about twelve or thirteen per cent. is illuminating-gas, and seven per cent is coal-tar, as treated in the London gas-works. The difference, therefore, between the two processes as to the amount of heat required, and consequently the cost of fuel used, is very clear in favor of my process. It is clearer still when we consider that the fuel necessary to heat the whole crude mass to a point below visible redness is quite sufficient, as here used, to heat the twenty per cent., or the whole volatile hydrocarbons, to a cherry-red heat, as required by this process, because the heat is sufficient to keep the gas-back red hot. Whatever is saved in fuel by this process will result in a similar saving in the longer use of the retorts from working at a lower heat. This process also diminishes the product of coal-tar to such an extent that this refuse is no longer an eye-sore to the manufacturer, but is in itself a large source of emolument, being almost entirely worked up into the best illuminating-gas. This adds to the amount of gas produced by the ordinary mode of working a large proportion. Thus the coal-tar is about one-third of the whole volatile hydrocarbon generated, and as this process converts nearly all of this material to gas it increases the amount of gas produced over that obtained by the ordinary process now in use very largely; and whatever coal-tar there may be generated by this process, be it more or less, it is capable of being converted into the best gas, in the same retorts used for distilling coal, by merely adding a feed apparatus, seen in Fig. 4, which is provided with the retorts, for whatever may chance to escape decomposition in the gas-back or decomposing-chamber is reserved to be treated as liquid feed, in the manner presently to be described. It requires purification in the same manner as coal-gas. The small quantity of coal-tar made by this process, therefore, is not very objectionable, because the self-same vapor which is deposited as tar, is in the best state to be revaporized and presented anew to the decomposing-chamber, presently to be described. In case the present decomposing-chamber is dispensed with the vapor is decomposed in the space between the inner and outer retort, as hereinafter described.

In the accompanying drawings, Figure 1 is a sectional elevation of a gas-stove, in which A is the vapor-generator and E the generating-chamber or gas-back. Fig. 2 is an enlarged view of the gas-making chamber E, the tar-drip, and washer G, of which $G^1$ is a separate view of the left side of the cover and $G^2$ a separate view of right side. Fig. 3 is a sectional end view of the double retort and gas-back. Fig. 4 is a longitudinal sectional elevation of the retort, showing the mode of supplying it with liquid feed, also the movable bottom $c^2$ in place. Fig. 5 is the removable bottom of the inner retort, showing the position of the braces *c c c*, and the raised edges of the inner surface. Fig. 6 is a bottom view of the inner retort, showing the locking-braces *c c c* when locked and unlocked. It also exhibits vapor-holes *m m*, &c., which are used in place of gas-back in certain cases. Fig. 7 shows a modification of the decomposing-chamber, consisting of the U-formed tube $c^3$ or $b^3$, which, though effectual on a small scale, is liable to clog by a deposit of carbon. Fig. 8 represents a top view of the fire-chamber in the gas-stove, and of the gas-back E, being a section of the stove in line *n n* in Fig. 1. Fig. 9 is a top view of a bench of three retorts, $A^4$ $A^5$ $A^6$, designed to work large quantities of coal at a charge, and deliver the vapor into a large gas-back, K, heated red hot on the side $y^3$, and discharging its gas through pipe $y^4$, and the pressure in the retort is relieved by means of the exhaust-fan L, which may be placed in the passage M in certain cases. Figs. 10 and 11 show the use of the D-retort, in which the gas-back is not used.

In all the drawings similar letters and figures refer to the same parts.

Of the above apparatus, that of Figs. 3, 4, 5, 6, and 9 are the most important in the present application, in which the double D-retort is used in combination with a decomposing-chamber or gas-back, E or K. In case a single retort is used, the heat is controlled in another way, to be described presently.

The chief reason for using the double D-retort in preference to the single one is, that the heat of the charge is more readily kept at the desired temperature; otherwise it might rise to a sufficient degree to convert the charge to gas in the inner retort. This would be fatal to the process, which requires that no permanent gas be formed in the inner retort, and that none of the vapor escape decomposition into permanent gas in the gas-back. If the single D-retort could be certainly kept at a heat below redness, then it would be preferable in some respects to the double one. These retorts, for converting vaporizable gas fuel into vapor, may be made very large, so as to contain several tons of material at a time, and discharge their vapor into a very large decomposing-chamber, to be described further on.

In all small apparatus applicable to domestic purposes, where the D-retort does not exceed three feet in length, the inner retort is more necessary to prevent extremes in temperature, and may be made of Russia sheet-iron. If it be a retort six to eight feet long, then the inner retort should be of thin cast-iron, as thin and light as it could be conveniently cast. A retort of this kind with fair usage would last many years. The outer retort may be constructed in the usual way now found in our city gas-works, except it may be made much larger. Indeed, there can hardly be a limit to the size of the retort, from the fact that the temperature is kept so low as not to effect the strength of the metal. The retorts may be immense cooking-ovens connecting with an exhausting-fan, so that the pressure be entirely removed from the inner surface of the retorts, and carried onward through the purifiers and washers to the gasometers. The exhaust apparatus may be placed with greater advantages between the purifiers and gasometers, which will better equalize the pressure through the whole apparatus from the retorts to the gasometers.

Figs. 3, 4, 5, and 6 exhibit the different parts of a D-retort in connection with the decomposing gas-back; and 1, 2, and 8 show different views of the gas-back. 10 and 11 show views dispensing with gas-back.

$A^1$ represents the inner retort, and B the outer retort, the latter made in the usual way found in our gas-works. The former is constructed in a peculiar way now to be described. It is made of thin cast-iron, chiefly with reference to the strength required when used at or below incipient red heat. For small retorts not exceeding three feet long it may be made of Russia sheet-iron, with a removable bottom, $c^2$, Figs. 3, 4, 5, and 6, and with a large opening in the top for the free escape of vapor opposite to a similar one in the outer retort. The flanges *a* on the sides project downward to form the legs or resting parts bearing on the bottom of the outer retort, so that the inner retort may not be heated to redness. The space between the inner and outer retort may be one inch between the two bottoms, and a half or three-quarters of an inch between the sides. On the inside of $A^1$ are small flanges or projections *k* running the whole length of the retort, and forming a bearing, against which the sides of the removable bottom $c^2$ press, when it is locked in place by the supports *c c c*, as shown in Figs. 5 and 6. This removable bottom is so constructed to form a convenient means of charging and discharging the gas fuel. In Fig. 3 it is shown in its natural position ready for use. In Fig. 6 it is shown in position ready to be opened for discharging the spent coal or the coke. This is accomplished by turning the supports *c* on their pivots, so that the ends thereof shall slide out of their slotted bearings, when the bottom $c^2$ is easily removed and inverted in the position seen in Fig. 5, where are also shown the turned-up edges of this bottom, making it a sort of long pan. The design of the pan form is to adapt it to liquid feed, to be fed through pipe *e* through a suitable feed apparatus, shown in Fig. 1, the stop-cock $c^4$ controlling the amount fed. The nuts 1 2 3 in Fig. 4, are for fastening and removing the feed-pipe. This feed apparatus is designed to work coal-tar, oil, fats, &c., and this process is, as far as known, the only one that is capable of working coal-tar economically, from the fact that the gas is made from vapor. But as the carbon in coal-tar is greatly in excess over the hydrogen, it requires some material that would furnish by itself the light carbureted hydrogen. This desideratum is met in the use of ordinary white-pine sawdust, made into hard cakes or blocks, pressed like kindling materials, only enough coal-tar being used to act as a cement to make the woody matter to adhere. The discharge-opening at $k^2$ is a concentric ring-space filled with a mixture of eight parts bismuth, five of lead, and three of tin, making a cap-joint of fusible metal for receiving the pipe $i$, the other end of which, $h^3$, is received into a suitable joint, and discharges the vapor received from A into the decomposing-chamber E, denominated the gas-back. This gas-back is somewhat of the form of a hollow fire-brick, made of a casting in a single piece of iron, and having a discharge-opening at the bottom $b^6$ for the escape of the refuse carbon that falls from the fire-plate $y$. The tube $b^4$, which discharges the vapor from the retort, delivers it against the plate $y$, already red hot, and which decomposes it into permanent gas. It is then reflected back and passes out through pipe $b^5$, and is conducted to the washer, condenser, purifier, and gasometer. Plate $y$ is sometimes coated with carbon, and then is cleaned by turning crank $y^2$, having on its extremity the scraper-blade $z$, and working through an air-tight packing; or it may be cleaned by means of the hand-scraper V, worked through $b^6$, with also an air-tight collar. When scraper $y$ is not in use it is drawn back so that the blade $z$ rests against the end of tube $b^4$. If it should be ascertained in works on a large scale that the cranks need to be turned frequently, the shaft may be attached to a belt-pulley and worked by power continually. The conditions required in the gas-back are that pipe $b^5$ shall be somewhat larger than $b^4$, so as to discharge freely the gaseous contents which have been expanded by heat—say 700° of Fahrenheit to, say, 1,000°. Practically, if $b^4$ be an inch in diameter, $b^5$ may be an inch and a half in diameter. Secondly, it is indispensable that the outside of the chamber E be below a red heat, and that plate $y$ shall be sustained constantly at a red heat, so that all the vapor may be received against the red-hot plate, and that none of it may escape being converted into illuminating-gas. Plate $y$ is sometimes modified by making it a concave parabolic reflector and radiator, for the purpose of having the vapor projected against it from the end of pipe $b^4$, as from the focal center of said concavity, by which means the reflected currents would flow back in horizontal parallel lines to be discharged through pipe $b^5$.

One of the objections to this concave heater is that it is less easily cleaned than the plain surface when the hand-scraper (the most convenient in practice) is used. Indeed, with the plain surface very little cleaning is required, from the fact that the cake of carbon curls up and falls by its own gravity from the heated plain plate $y$.

In the operation of this retort and gas-back we will suppose the whole apparatus in place, as seen in Fig. 3. The cover of B is removed, exhibiting $A^1$ in its place and ready to be charged with coal. It is supposed to be a retort six feet long and one foot wide, and made of thin cast-iron. It is drawn out on a sort of table or railway, of the same height or level at the outer retort. It is then turned over on its back, the removable bottom $c^2$ unlocked and removed, and the retort filled to two-thirds of its capacity, the cover replaced, and the supports $c$ locked in their places, and the retort $A^1$ shoved into retort $B^1$, previously heated to redness, the door closed in, and the heat continued. Vapor soon escapes through pipe $b^5$, and permanent gas soon comes over, and so continues till the charge is worked off. Occasionally—or, say, once in an hour—the surface $y$ should be scraped off with the hand-scraper V. The door may now be opened, and the inner retort $A^1$ is drawn out upon the railway, and another previously charged is shoved into the retort $B^1$, and thus the generation of gas is made continuous.

In using D-retorts six feet long, though a single decomposing-chamber or gas-back of twelve inches width would give all the necessary space in width which would be required for converting all of its vapor into gas, and a furnace, therefore, that would heat one retort its whole length would be sufficient to heat twelve gas-backs, or would be sufficient to convert into illuminating-gas the vapor generated by twelve separate retorts, yet the fire-surface in practice is required to be much larger, so as to meet all contingencies of sudden liberation of much gaseous matter. In accordance with this view the benches of retorts as now used in gas-works, if the heat were reduced so that the retorts would be sustained at incipient redness only, the vapor from a retort-house of ninety-six retorts might be converted into good illuminating-gas by the gas-backs capable of being heated in a single retort-furnace, or in two or three. Although the estimate here given may not be found to be the exact proportions of retorts and gas-backs, yet from the experiment made on a small scale it is believed they cannot be far from correct.

In Fig. 9 a bench of three retorts, $A^4$ $A^5$ $A^6$, is so arranged as to deliver the vapor into a single gas-back, K, the plate $y^3$ of which is in contact with the fire and heated to a cherry-red heat, the gas from which escapes through pipe $y^4$, and thence through exhaust-fan L, and so on to the gasometer. The object in using two or more retorts, $A^4$ $A^5$ $A^6$, is to vaporize the hydrocarbon, and when connected to one or more retorts, K, that are heated to a cherry-red heat the vapor becomes perfectly decomposed and made into permanent gas. It is proper to state, however, in regard to the use of the exhaust-fan, that the power of the exhaust must not be so great as to make the pressure within the retorts less than the ordinary pressure of the atmosphere without; for if it were so the current would be drawn through the decomposing-chamber K without striking against plate $y^3$. The exhaust-fan should act only to take off a part of the pressure. If, however, it were found desirable to remove a greater portion of the pressure than is consistent with the current against the plate $y^3$, then we have only to place the exhaust-fan at M and the difficulty is obviated. There must be a projectile force in the current that enters the gas-back sufficient to dash the jet of vapor against the plate $y^3$. If from any cause it fail to do this a portion of the vapor will fail to be converted into gas, and will be condensed as coal-tar. The production of coal-tar is therefore the result of the defect in the jet of vapor, or of the deficiency of the heat of the plate $y^3$ or $y$; or, lastly, the distance between the end of pipe $b^4$ and the red-hot plate $y$ or $y^3$ of the gas-back may be such that no part of the jet may fail to be heated to redness. In cases where the pipe $b^4$ is large in comparison with the amount of vapor generated, a disk of metal, $z^2$, Fig. 2, is used, which disk is screwed on the end of pipe $b^4$, and the pipe screwed in sufficiently near the heating-plate $y$ or $y^3$ to secure the heating of all the vapors to the required red heat.

The peculiarity of this process, differing from every other, is, first, it prevents any solid or liquid feed to be heated red hot itself, but only hot enough to expel its vapor and force it against a red-hot surface, with means for sudden, direct, and quick escape to a cooler chamber, where decomposition of gas cannot take place; and, secondly, that none of the vapor generated can escape a red heat to convert it all to gas.

There is still another modification of the D-retort adaptable to feed coal or to the liquid feed. In this apparatus the gas-back is dispensed with altogether, and as a decomposing-chamber in place of it is used the space intervening between the inner and outer retort, as may be seen by inspecting Figs. 3, 4, 6, 10, 11, by making the following modification: Close the opening in the dome part of the retort A, Figs. 3 and 4, and open a series of small holes, $m$, on the sides $A''$, near its bottom, Fig. 6, shown also by the arrows in Figs. 10 and 11, through which the vapor escapes in jets against the red-hot sides of retort $B^1$, by which it is converted to permanent gas, and escapes up the sides between the two retorts, and out through the escape-pipe near $k^2$. In this, where the gas-back is dispensed with, the upper part of the outer retort is prevented from being heated to redness by the dome-shield piece $x\,x$, which may be of mason-work or of iron. This modification requires the outer retort to be heated somewhat higher than when the gas-back is used, from the fact that the lower part of the sides must be kept at a full red heat, which is not required in the other case. It has advantages over the gas-back, preventing comparatively a larger decomposing-surface, and preventing any inequality of pressure from affecting the character of the gas, as may arise where the gas-back happens to be too small for the amount of vapor generated. It must also be borne in mind that the tubes leading to and from the gas-back must be of a size proportioned to the charge of gaseous matter passing through them. In working liquids, as coal distillates, that are liable to froth and carry over vapor and choke, the gas-back $b^6$ is made the gas-discharge instead of $b^5$, attaching the tar-drip or gas-main to $b^6$ and the condenser to that, and the gas then passes to the purifiers and to the gasometers, which, forming no part of this improvement, have not been described in detail, except the vessel G for washing the gas. (See Fig. 2.) The above use of $b^6$ for discharging the gas may be adopted in working coal, and more especially cannel-coal.

As experience has thus far shown that in ordinary working of the gas-back there is little occasion for using blade $z$ and crank $y^2$, this device may be omitted and scraper V depended on. Of the various forms of retort for working this process represented or described above, that shown in Figs. 10 and 11 is regarded as the best for efficiency and cheapness. That seen in Fig. 1 does well where small quantities are wanted, but is not fitted for large establishments.

Having thus fully described the invention, what is claimed as new, and desired to be secured by Letters Patent, is—

1. The vapor-generator A, filled with hydrocarbon liquids by any suitable means, and provided with a vapor-pipe, $i$, leading into a decomposing-chamber, E, substantially as set forth.

2. The combination, in a hydrocarbon-gas generator, of an inner retort, closed at both ends, with a space between it and the inner wall of the outer retort, whereby the hydrocarbon (solid or liquid) is first vaporized in the inner retort, and passes from thence into the space between the retorts to form a fixed gas, substantially as set forth.

3. The combination, in a hydrocarbon-gas generator, of two or more retorts, $A^4$ $A^5$ $A^6$, arranged together with a gas-back or decomposing-retort, K, and exhauster L, wherein the retorts $A^4$ $A^5$ $A^6$ vaporize, retort K decomposes, and the exhauster L withdraws the gas, substantially as herein described.

In testimony whereof we have hereunto set our hands this 16th day of February, 1870.

WILLIAM J. NICHOLS.
A. C. RAND.

Witnesses:
J. M. MASON,
C. C. ALEXANDER.